US012679229B2

(12) United States Patent (10) Patent No.: US 12,679,229 B2
Lee et al. (45) Date of Patent: Jul. 14, 2026

(54) POWER NET APPARATUS OF A FUEL CELL AND CONTROL METHOD THEREOF

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Yong Hwi Lee, Hwaseong-si (KR); Young Woo Noh, Hwaseong-si (KR); Byoung Kuk Lee, Suwon-si (KR); Man Jae Kwon, Suwon-si (KR); Seung Hyun Kang, Suwon-si (KR); Dong Hwan Kim, Suwon-si (KR); Yun Seong Hwang, Suwon-si (KR); Hyeon Soo Kim, Suwon-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/929,899

(22) Filed: Oct. 29, 2024

(65) Prior Publication Data

US 2025/0381856 A1 Dec. 18, 2025

(30) Foreign Application Priority Data

Jun. 14, 2024 (KR) ........................ 10-2024-0077736

(51) Int. Cl.
B60L 50/40 (2019.01)
B60L 7/10 (2006.01)
(Continued)

(52) U.S. Cl.
CPC ............... B60L 50/70 (2019.02); B60L 50/40 (2019.02); B60L 58/30 (2019.02); (Continued)

(58) Field of Classification Search
CPC .......... B60L 50/70; B60L 50/40; B60L 58/30; B60L 2210/12; B60L 2210/14; (Continued)

(56) References Cited

U.S. PATENT DOCUMENTS 12,095,069 B2 9/2024 Lee et al.
2015/0084566 A1* 3/2015 Schneider ................ H02P 4/00
318/440

(Continued)

FOREIGN PATENT DOCUMENTS

KR 20220144692 * 10/2022
KR 2024-0009577 A 1/2024

*Primary Examiner* — Rexford N Barnie
*Assistant Examiner* — Xuan Ly
(74) *Attorney, Agent, or Firm* — MCDONNELL BOEHNEN HULBERT & BERGHOFF LLP

(57) ABSTRACT

A power net apparatus for a fuel cell includes a fuel cell configured to supply power to an inverter of a vehicle, a supercapacitor configured to assist the fuel cell, a bidirectional converter configured to charge and discharge the fuel cell and the supercapacitor, a switching device configured to distinguish driving modes for the vehicle, and a controller configured to drive the vehicle by controlling the supercapacitor to charge or discharge by controlling the switching device and the bidirectional converter according to the driving modes for the vehicle, and by assisting the fuel cell.

19 Claims, 18 Drawing Sheets

(51) Int. Cl.

| | |
|---|---|
| *B60L 50/70* | (2019.01) |
| *B60L 58/30* | (2019.01) |
| *H01M 16/00* | (2006.01) |
| *H02J 7/14* | (2006.01) |
| *H02J 7/34* | (2006.01) |
| *H02P 27/06* | (2006.01) |

(52) U.S. Cl.

CPC ......... *H01M 16/003* (2013.01); *H02J 7/1438* (2013.01); *H02J 7/345* (2013.01); *B60L 2210/12* (2013.01); *B60L 2210/14* (2013.01); *B60L 2210/40* (2013.01); *H01M 2250/20* (2013.01); *H01M 2250/402* (2013.01); *H02J 2207/20* (2020.01)

(58) Field of Classification Search

CPC .... B60L 2210/40; B60L 7/10; H01M 16/003; H01M 2250/20; H01M 2250/402; H01M 16/00; H02J 7/1438; H02J 7/345; H02J 2207/20; H02P 27/06

USPC ......................................................... 307/9.1

See application file for complete search history.

(56) References Cited

U.S. PATENT DOCUMENTS

2021/0175527 A1 * 6/2021 Lee ..................... H01M 8/0494
2024/0021923 A1 1/2024 Lee et al.

* cited by examiner

POWER NET APPARATUS OF A FUEL CELL AND CONTROL METHOD THEREOF

CROSS REFERENCE TO RELATED APPLICATIONS

This application claims priority to and the benefit of Korean Patent Application No. 10-2024-0077736, filed in the Korean Intellectual Property Office on Jun. 14, 2024, the entire contents of which are incorporated herein by reference.

BACKGROUND

(a) Field

The present disclosure relates to a power net apparatus for a fuel cell and a control method therefore, and more particularly, to a control technique for each vehicle driving mode in a power net apparatus of a serial structure.

(b) Description of the Related Art

A fuel cell, which converts chemical energy into electrical energy by using a redox reaction of hydrogen and oxygen supplied from a hydrogen supply device and an air supply device, respectively, includes a fuel cell stack that generates electric energy and a cooling system for cooling the fuel cell stack.

In particular, in hydrogen electric vehicles, batteries are applied to compensate for a slow output speed of the fuel cell, and vehicle power performance may be improved by using a supercapacitor that has a faster response speed and a higher current output than those of the batteries.

A parallel power net apparatus including a supercapacitor and a fuel cell configured in parallel requires two DC/DC converters to control a voltage of a power source, which has disadvantages in terms of size and cost. On the other hand, a serial power net apparatus including a supercapacitor and a fuel cell configured in series has a merit of reducing volume and cost by lowering a rated voltage of both voltage sources compared to the parallel power net apparatus.

However, the serial power net device has limitations in that it is impossible to transfer an output to a motor using only the supercapacitor, and a charging voltage of the supercapacitor cannot be controlled during regenerative braking.

SUMMARY

An exemplary embodiment of the present disclosure attempts to provide a power net apparatus and a method therefore, capable of transferring an output to a motor from a supercapacitor alone in a series power net apparatus and controlling a charging voltage of the supercapacitor during regenerative braking.

An exemplary embodiment of the present disclosure attempts to provide a power net apparatus and a method therefore, capable of reducing a current magnitude of a converter for satisfying a same output condition by connecting a fuel cell and a supercapacitor in series and operating them in a series power net apparatus, reducing current stress and heat generation of the power net apparatus.

An exemplary embodiment of the present disclosure attempts to provide a power net apparatus and a method therefore, capable of miniaturizing a power network in a vehicle by reducing a rated voltage of each power source, by using a sum of a voltage of a fuel cell and a voltage of a supercapacitor as an input voltage of a converter, when the fuel cell and the supercapacitor are connected in series and operate.

The technical objects of the present disclosure are not limited to the objects mentioned above, and other technical objects not mentioned may be clearly understood by those skilled in the art from the description of the claims.

An exemplary embodiment of the present disclosure provides a power net apparatus comprising a fuel cell configured to supply power to an inverter of a vehicle, a supercapacitor configured to assist the fuel cell, a bidirectional converter configured to charge and discharge the fuel cell and the supercapacitor, a switching device configured to distinguish driving modes for the vehicle, and a controller configured to drive the vehicle by controlling the supercapacitor to charge or discharge by controlling the switching device and the bidirectional converter according to the driving modes for the vehicle, and by assisting the fuel cell.

In an exemplary embodiment of the present disclosure, the controller may be configured to control the switching device and the bidirectional converter to supply power to the inverter through an independent operation of the supercapacitor in response to driving the vehicle.

In an exemplary embodiment of the present disclosure, the controller may be configured to control the switching device and the bidirectional converter to charge the supercapacitor using power generated by regenerative braking in response to decelerating the vehicle.

In an exemplary embodiment of the present disclosure, the fuel cell and the supercapacitor may be connected in series.

In an exemplary embodiment of the present disclosure, the switching device may include a first switch provided between the fuel cell and the supercapacitor, a second switch connected in series with the first switch; and a third switch provided between a first end of the fuel cell and the bidirectional converter.

In an exemplary embodiment of the present disclosure, the bidirectional converter may include a first turn-on device provided between the supercapacitor and the third switch, and a second turn-on device and a third turn-on device connected in series, and the second turn-on device and the third turn-on device transfer a voltage applied from the first turn-on device to the inverter.

In an exemplary embodiment of the present disclosure, the bidirectional converter may further include a first inductor provided between a common node of the second turn-on device and the third turn-on device and a first end of the first turn-on device, and a second inductor connected to a first end of the supercapacitor and a second end of the first turn-on device.

In an exemplary embodiment of the present disclosure, the bidirectional converter may further include a diode connected to a second end of the second inductor and a first end of the fuel cell.

In an exemplary embodiment of the present disclosure, the driving modes for the vehicle may include a first mode that performs a precharge operation to charge the supercapacitor through the fuel cell in response to starting the vehicle, a second mode that transfers power to the inverter through an independent operation of the fuel cell in response to driving the vehicle; and a third mode that transfers power to the inverter and charges the supercapacitor through the independent operation of the fuel cell in response to the vehicle.

In an exemplary embodiment of the present disclosure, the driving modes for the vehicle may include a fourth mode that transfers power to the inverter through an independent operation of the supercapacitor in response to driving the vehicle, a fifth mode that transfers power that is higher than a predetermined reference to the inverter through the fuel cell and the supercapacitor in a case where a high output mode is required in response to driving the vehicle, and a sixth mode that charges the supercapacitor using power generated by regenerative braking in response to decelerating the vehicle.

In an exemplary embodiment of the present disclosure, the controller may be configured, in the first mode, to control the bidirectional converter to operate as a buck converter by connecting the first switch and the third switch, opening the second switch, and performing on/off control of the first turn-on device.

In an exemplary embodiment of the present disclosure, the controller may be configured, in the second mode, to control the bidirectional converter to operate as a boost converter by connecting the third switch, opening the first switch and the second switch, and performing on/off control of the second turn-on device and the third turn-on device.

In an exemplary embodiment of the present disclosure, the controller may be configured, in the third mode, to drive the vehicle through an operation of the fuel cell by connecting the first switch and the third switch, and also charge the supercapacitor through the operation of the fuel cell.

In an exemplary embodiment of the present disclosure, the controller may be configured, in the fourth mode, to control the bidirectional converter to operate as a boost converter by connecting the first switch, opening the second switch and the third switch, and performing on/off control of the first turn-on device, the second turn-on device, and the third turn-on device.

In an exemplary embodiment of the present disclosure, the controller may be configured, in the fifth mode, to control the bidirectional converter to operate as a boost converter by connecting the second switch, opening the first switch and the third switch, and performing on/off control of the first turn-on device, the second turn-on device, and the third turn-on device.

In an exemplary embodiment of the present disclosure, the controller may be configured, in the sixth mode, to control the bidirectional converter to operate as a buck converter by connecting the first switch, opening the second switch and the third switch, and performing on/off control of the first turn-on device, the second turn-on device, and the third turn-on device.

In an exemplary embodiment of the present disclosure, the controller may be configured to generate pulse signals for on/off control of the first turn-on device, the second turn-on device, and the third turn-on device by using a current flowing in the first inductor or the second inductor or a voltage at a side of the inverter.

In an exemplary embodiment of the present disclosure, the controller may be configured to generate pulse signals for on/off control of the first turn-on device, the second turn-on device, and the third turn-on device by using a current flowing in the first inductor or the second inductor or a voltage at a side of the inverter.

In an exemplary embodiment of the present disclosure, the controller may be configured to generate a first pulse signal for controlling the first turn-on device using a current flowing in the first inductor or the second inductor or a voltage at a side of the inverter, and to generate a second pulse signal complementary to the first pulse signal and to control the second turn-on device using the second pulse signal.

An exemplary embodiment of the present disclosure provides a control method for a power net apparatus for a fuel cell, including a fuel cell configured to supply power to an inverter of a vehicle, a supercapacitor configured to assist the fuel cell, a bidirectional converter configured to charge and discharge the fuel cell and the supercapacitor, and a switching device for distinguishing driving modes for the vehicle, the method comprising driving the vehicle by controlling the supercapacitor to charge or discharge by controlling the switching device and the bidirectional converter according to the driving modes for the vehicle, and by assisting the fuel cell.

According to the present technique, stability and reliability may be improved by transferring an output to a motor from a supercapacitor alone in a series power net apparatus and controlling a charging voltage of the supercapacitor during regenerative braking.

According to the present technique, a current magnitude of a converter for satisfying a same output condition may be reduced by connecting a fuel cell and a supercapacitor in series and operating them in a series power net apparatus, reducing current stress and heat generation of the power net apparatus.

In some embodiments, the method further includes driving the vehicle by controlling the supercapacitor to charge or discharge by controlling the switching device and the bidirectional converter according to the driving modes for the vehicle, and by assisting the fuel cell.

Furthermore, various effects which may be directly or indirectly identified through the present specification may be provided.

DETAILED DESCRIPTION

Figure 1:
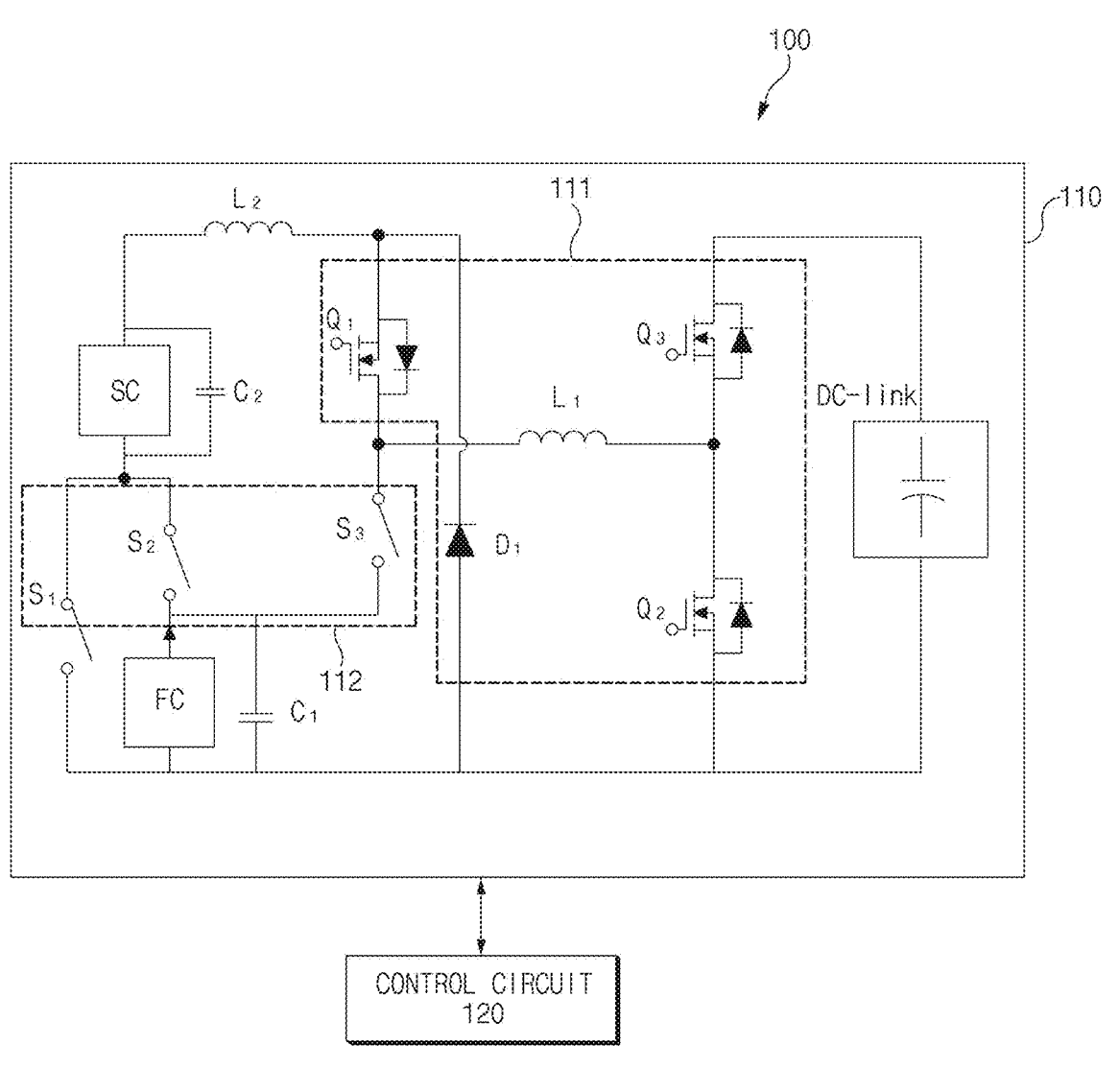
FIG. 1 illustrates a block diagram showing a configuration of an example power net apparatus for a fuel cell.

Hereinafter, some exemplary embodiments of the present disclosure will be described in detail with reference to exemplary drawings. It should be noted that in adding reference numerals to constituent elements of each drawing, the same constituent elements include the same reference numerals as possible even though they are indicated on different drawings. In describing an exemplary embodiment of the present disclosure, when it is determined that a detailed description of the well-known configuration or function associated with the exemplary embodiment of the present disclosure may obscure the gist of the present disclosure, it will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 8.

FIG. 1 illustrates a block diagram showing a configuration of an example power net apparatus for a fuel cell.

The power net apparatus 100 according to an exemplary embodiment of the present disclosure may be implemented inside a vehicle. In the instant case, the power net apparatus 100 for the fuel cell electric vehicle may be integrally formed with internal control units of the vehicle, or may be implemented as a separate device to be connected to control units of the vehicle by a separate connection means.

Referring to FIG. 1, the power net apparatus 100 according to an exemplary embodiment of the present disclosure may include a power net circuit 110 and a control circuit 120.

The power net circuit 110 may be equipped with a fuel cell FC and a supercapacitor SC connected in series, thereby reducing a voltage of the supercapacitor SC by a fuel cell voltage from an inverter required current. Furthermore, the supercapacitor SC may be discharged to a minimum operating voltage, to increase use efficiency. As a result, the voltage of the supercapacitor SC may be lowered so as to reduce a number of cells, and a charging voltage of the supercapacitor SC may be lowered so as to reduce an inrush current phenomenon during initial charging.

Furthermore, the power net circuit 110 may be configured to minimize a volume by including a single bidirectional converter 111 instead of a unidirectional DC/DC converter for a hydrogen fuel cell and a bidirectional DC/DC converter for charging and discharging a supercapacitor. That is, the power net circuit 110 may be configured to supply power required to drive the vehicle by connecting the fuel cell FC and the supercapacitor SC in series and charging and discharging the supercapacitor 102 with one bidirectional converter 111 (DC/DC converter).

The power net circuit 110 may include the fuel cell FC, the super capacitor SC, the bidirectional converter 111, a switch device 112, and bypass capacitors $C_1$ and $C_2$.

The fuel cell FC may supply power to a DC link side of the vehicle as a power source, and the supercapacitor SC may assist the fuel cell FC and may be connected in series with the fuel cell FC to supply power to a DC link. In the instant case, the DC link side may include an inverter, a motor, etc. that require power supply.

The bidirectional converter 111 may convert power for charging and discharging the fuel cell FC and the supercapacitor SC, and in the present disclosure, may be driven by a buck converter or boost converter. In the instant case, the buck converter is a DC-DC switch-mode power supply for stabilizing an input voltage of an unregulated DC supply to buck or step down it to a lower output voltage, and is also called a step-down converter. The buck converter may output most of inputted power as it is. The boost converter is a DC-DC switch-mode power supply for stabilizing the input voltage of an unregulated DC supply to boost or increase it to a lower output voltage, and is called a step-up converter.

The bidirectional converter 111 may include turn-on devices $Q_1$, $Q_2$, and $Q_3$, inductors $L_1$ and $L_2$, and a diode $D_1$.

The turn-on device $Q_1$ may be connected between the inductor $L_2$ and the switch $S_3$. The turn-on devices $Q_2$ and $Q_3$ may be connected in series, and the inductor $L_1$ may be provided between a common node of the turn-on devices $Q_2$ and $Q_3$ and a first end of the turn-on device $Q_1$. The turn-on device $Q_1$ may transfer a voltage of the supercapacitor SC to the switch $S_3$ or the inductor $L_1$, and the turn-on devices $Q_2$ and $Q_3$ may be driven according to a duty ratio to transfer the voltage received from the turn-on device $Q_1$ to the DC link.

The turn-on devices $Q_1$, $Q_2$, and $Q_3$ may include a MOSFET, which is a power semiconductor device required for a switching operation of a converter for each vehicle operation mode according to a circuit switching operation. The turn-on devices $Q_1$, $Q_2$, and $Q_3$ may be controlled using a PWM method to control a current of the fuel cell FC so as to charge and discharge the supercapacitor SC and supply power required for the vehicle.

The inductor $L_2$ may be connected between the supercapacitor SC and the turn-on device $Q_1$, and the diode $D_1$ may be provided between a second end of inductor $L_2$ and a first end of the fuel cell FC.

The switch device 112 may be a device for connecting and disconnecting circuits to perform a mode required in response to driving a vehicle, and may include switches $S_1$, $S_2$, and $S_3$.

The switch $S_2$ may be connected in series with the fuel cell FC and may be provided between the fuel cell FC and the supercapacitor SC, and the switch $S_2$ and the fuel cell FC connected in series may be connected in parallel with the switch $S_1$. The switch $S_3$ may have a first end connected in series with the turn-on device $Q_1$, and a second end connected to the fuel cell FC. That is, the switch $S_3$ may be provided between a first end of the fuel cell FC and the bidirectional converter 111.

The bypass capacitor $C_1$ may be connected in parallel with the fuel cell FC to suppress a voltage fluctuation of the fuel cell FC, and the bypass capacitor $C_2$ may be connected in parallel with the supercapacitor SC to suppress a voltage fluctuation of the supercapacitor SC.

The control circuit 120 may be configured to control the switch device 112 and the bidirectional converter 111 according to a vehicle driving mode, so as to control the super capacitor SC to charge or discharge and assist the fuel cell FC, thereby driving the vehicle.

In the instant case, the bidirectional converter 111 may operate in different boost topologies depending on the vehicle driving mode.

The vehicle driving mode may include a first mode that performs a precharge operation to charge the supercapacitor SC through the fuel cell FC in response to starting the vehicle, a second mode that transfers power to an inverter through a sole operation of the fuel cell FC in response to driving the vehicle, a third mode that transfers power to the inverter and charges the supercapacitor SC through the sole operation of the fuel cell FC in response to driving the vehicle, a fourth mode that transmits power to the inverter through a sole operation of the supercapacitor SC in response to driving the vehicle, a fifth mode that transmits power that is higher than a predetermined reference to the inverter through the fuel cell FC and the supercapacitor SC in a case where a high-output mode is required in response to driving the vehicle, and a sixth mode that charges the supercapacitor SC using power generated by regenerative braking in response to decelerating the vehicle.

The bidirectional converter 111 may operate as the boost converter or the buck converter depending on the vehicle driving mode.

In the first mode, the control circuit 120 may be configured to control the bidirectional converter 111 to operate as a buck converter by connecting the switches $S_1$ and $S_3$, opening the switch $S_2$, and performing on/off control of the turn-on device $Q_1$.

In the second mode, the control circuit 120 may be configured to control the bidirectional converter 111 to operate as a boost converter by connecting the switch $S_3$, opening the switch $S_1$ and the switch $S_2$, and performing on/off control of the turning-on device $Q_2$ and the turning-on device $Q_3$.

In the third mode, the control circuit 120 may be configured to drive the vehicle through the operation of the fuel cell FC by connecting the switch $S_1$ and the switch $S_3$, and also charge the supercapacitor SC through the operation of the fuel cell FC.

In the fourth mode, the control circuit 120 may be configured to control the bidirectional converter 111 to operate as a boost converter by connecting the switch $S_1$, opening the switch $S_2$ and the switch $S_3$, and performing on/off control of the turn-on device $Q_1$, the turn-on device $Q_2$, and the turn-on device $Q_3$.

In the fifth mode, the control circuit 120 may be configured to control the bidirectional converter 111 to operate as a boost converter by connecting the switch $S_2$, opening the switch $S_1$ and the switch $S_3$, and performing on/off control of the turn-on device $Q_1$, the turn-on device $Q_2$, and the turn-on device $Q_3$.

In the sixth mode, the control circuit 120 may be configured to control the bidirectional converter 111 to operate as a buck converter by connecting the switch $S_1$, opening the switch $S_2$ and the switch $S_3$, and performing on/off control of the turn-on device $Q_1$, the turn-on device $Q_2$, and the turn-on device $Q_3$.

The control circuit 120 may be configured to generate pulse signals for on-off control of the turn-on device $Q_1$, the turn-on device $Q_2$, and the turn-on device $Q_3$ by using a current flowing in the inductor $L_1$ or the inductor $L_2$ or a voltage on the DC link (inverter) side.

The control circuit 120 may be configured to generate pulse signals PWM for on-off control of the turn-on device $Q_1$, the turn-on device $Q_2$, and the turn-on device $Q_3$ by using a current flowing in the inductor $L_1$ or the inductor $L_2$ or a voltage on the DC link (inverter) side.

The control circuit 120 may be configured to generate a first pulse signal PWM1 for controlling the turn-on device $Q_1$ by using the current flowing in the inductor $L_1$ or the inductor $L_2$ or the voltage on the DC link (inverter) side.

The control circuit 120 may be configured to generate a second pulse signal PWM2 that is complementary to the first pulse signal PWM1, and control the turn-on device $Q_2$ by using the second pulse signal PWM2.

As such, according to the present disclosure, a power converter structure may be designed to miniaturize a power train of a hydrogen hybrid vehicle by applying a serial connection structure of a fuel cell and the super capacitor, a sole output to the DC link (inverter) side of the supercapacitor is possible by separating or connecting a circuit using the switches $S_1$, $S_2$, and $S_3$ and the supercapacitor may be controlled to be charged using power generated by regenerative braking.

The control circuit 120 may be electrically connected to internal components of the power net apparatus 100 for the fuel cell electric vehicle, may electrically control each component, and may be an electrical circuit that executes software commands, thereby performing various data processing and calculations described below.

The control circuit 120 may be implemented in the form of hardware, software, or a combination of and software. For example, the control circuit 120 may be implemented as a microprocessor, but the present disclosure is not limited thereto. The control circuit 120 may be, e.g., an electronic control unit (ECU), a micro controller unit (MCU), or other subcontrollers mounted in the vehicle.

Hereinafter, a structure and an operating principle of the converter for the six modes in response to starting or driving a vehicle in a power net apparatus with a series structure of a fuel cell and a supercapacitor according to the present disclosure will be described in detail with reference to FIGS. 2 to 7.

Figure 2A:
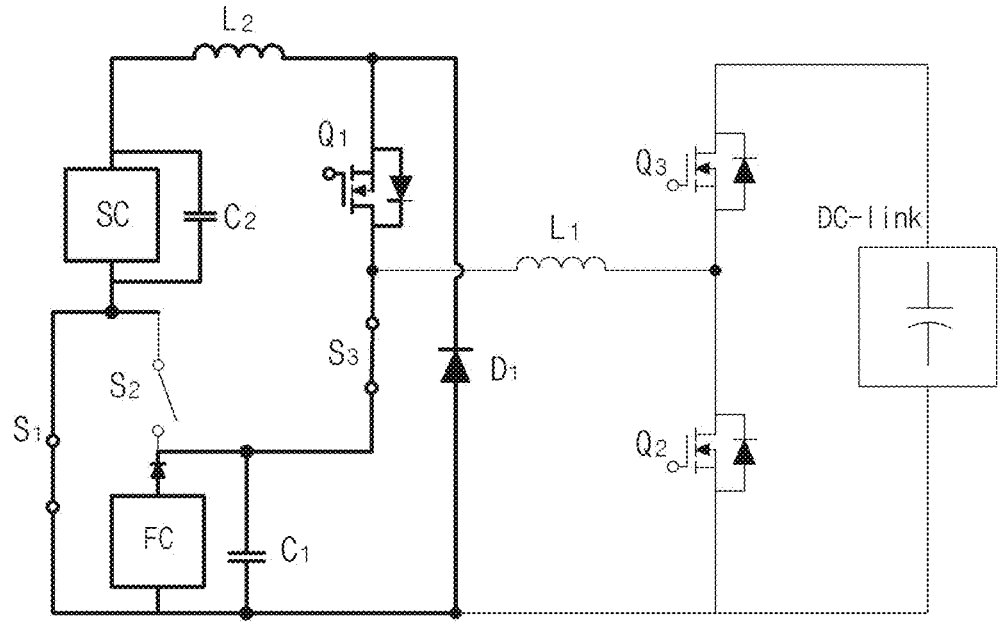
FIGS. 2A, 2B, and 2C illustrate a diagram for describing an example first mode that performs a precharge operation to charge a supercapacitor through a fuel cell in response to starting a vehicle.
Figure 2B:
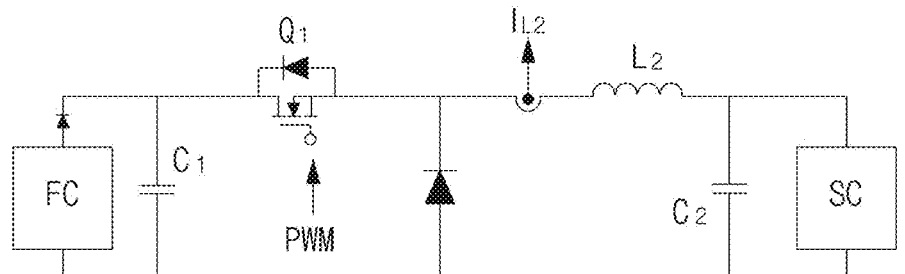
Figure 2C:
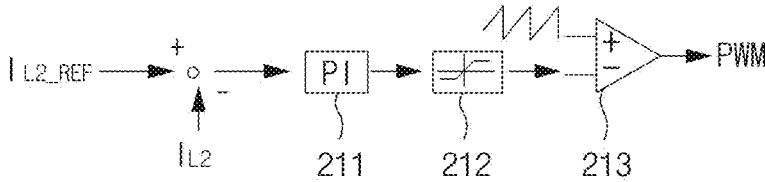

FIGS. 2A, 2B, and 2C illustrate a diagram for describing an example first mode that performs a precharge operation to charge a supercapacitor through a fuel cell in response to starting a vehicle.

In a case where the switch $S_1$ and the switch $S_3$ are connected as in FIG. 2A, the fuel cell FC may become an input voltage and the supercapacitor SC may become an output voltage as in FIG. 2B, and a buck converter equivalent circuit, which is a step-down type (the output voltage is applied lower than the input voltage) DC-DC converter, may be configured.

In a case where the turn-on device $Q_1$ is turned on, the diode $D_1$ is turned off, and according to an inductor voltage-current equation in Equation 1 below, a voltage of the inductor $L_2$ may become a difference between a voltage of the fuel cell FC and a voltage of the supercapacitor SC, so a positive voltage may be applied, and thus a current flowing through the inductor $L_2$ may increase.

In a case where the turn-on device $Q_1$ is turned off, the diode $D_1$ is turned on, and according to the inductor voltage-current equation in Equation 1 below, a negative voltage which is equal to the voltage of the supercapacitor SC may be applied to the inductor $L_2$, so the current flowing through the inductor $L_2$ may decrease.

$$v_L = L\frac{di_L}{dt}$$

Equation 1

In the instant case, a voltage transfer ratio $G_V$ transferred to the output side may be determined according to a duty ratio D of the turn-on device $Q_1$ of the buck converter, and this may be expressed as in following Equation 2.

$$G_V \equiv \frac{V_o}{V_i} = \frac{DV_i}{V_i} = D \qquad \text{Equation 2}$$

$V_i$ indicates a converter input voltage (FC voltage), and $V_o$ indicates a converter output voltage (SC voltage).

A view 203 shows a control algorithm flowchart of the first mode.

Referring to the view 203, in a case where a reference current Ref of a charging current of the supercapacitor SC is represented as $I_{L2\_Ref}$, the current flowing through the inductor $L_2$ is sensed through a current sensor (not shown), and a difference between the sensed current $I_{L2}$ and the reference current $I_{L2\_Ref}$ is used as an input of a PI controller 211. Next, an output signal of PI controller 211 passes through a limiter 212 and the output signal and a sawtooth wave are input to a comparator 213, and the comparator 213 compares the sawtooth wave and the output signal of the limiter 212 to output a PWM signal. In the instant case, the control circuit 120 may apply the limiter 212 to prevent turn-on device $Q_1$ of the buck converter from being fully turned on.

The PI controller 211, the limiter 212, and the comparator 213 for driving a control algorithm of the first mode of the view 203 may be included in the control circuit 120 of FIG. 1.

FIGS. 3A, 3B, 3C and 3D illustrate a diagram for describing an example second mode that transfers power to a DC link inverter through an independent operation of a fuel cell in response to driving a vehicle.

Figure 3A:
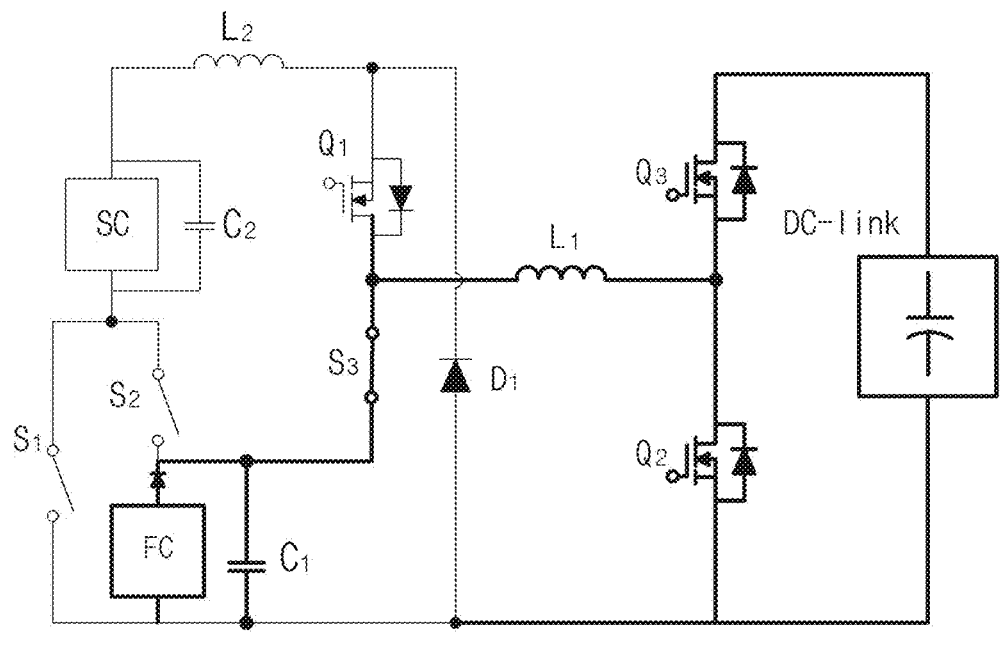
FIGS. 3A, 3B, 3C and 3D illustrate a diagram for describing an example second mode that transfers power to a DC link inverter through an independent operation of a fuel cell in response to driving a vehicle.
Figure 3B:
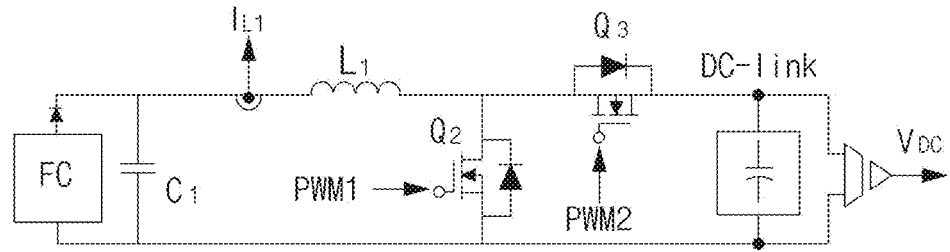

Referring to FIG. 3A, while the switch $S_3$ is connected and switches $S_1$ and $S_2$ are turned off, a boost converter equivalent circuit may be configured, which is a DC-DC converter of a boost type (the output voltage is applied higher than the input voltage) in which a voltage of the fuel cell FC becomes an input voltage and a voltage of the DC link side becomes an output voltage, as FIG. 3B.

In a case where the turn-on device $Q_2$ is turned on, the turn-on device $Q_3$ is turned off, and according to the inductor voltage-current equation of Equation 1, a positive voltage may be applied to the inductor $L_1$ equal to the voltage of the fuel cell FC, so the current flowing through the inductor $L_1$ may increase.

In a case where the turn-on device $Q_2$ is turned off, the turn-on device $Q_3$ is turned on, and according to the inductor voltage-current equation of Equation 1, a negative voltage may be applied to the inductor $L_1$ as much as the voltage of the fuel cell FC is subtracted from a voltage of the DC link, so the current flowing through the inductor $L_1$ may decrease.

In the instant case, a voltage transfer ratio transferred to the output side may be determined by the duty ratio D of the boost converter turn-on device $Q_2$, and this may be expressed as in Equation 3 below. (The duty ratio of $Q_3$ is 1-D)

$$G_V \equiv \frac{V_o}{V_i} = \frac{1}{1-D} \qquad \text{Equation 3}$$

$V_i$ indicates a converter input voltage (FC voltage), and $V_o$ indicates a converter output voltage (DC-link voltage).

Figure 3C:
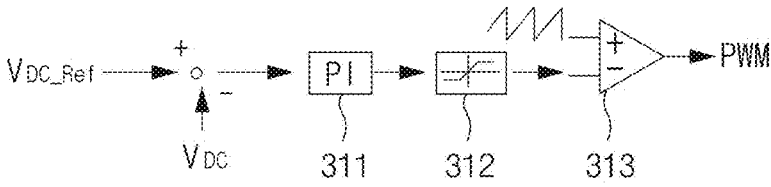

FIG. 3C shows Control Method 1 and may be applied for the purpose of controlling a voltage on the DC link side. As shown in FIG. 3C, a reference voltage of the voltage of the DC link side may be expressed as $V_{DC\_Ref}$, and a difference between a voltage $V_{DC}$ of the DC link side measured through a voltage sensor (not shown) and the reference voltage $V_{DC\_Ref}$ is used as an input of the PI controller 311.

The output of the PI controller 311 is output through the limiter 312 and enters the comparator 313 as an input. The comparator 313 compares the output signal of the limiter 312 with a sawtooth wave and outputs the signal PWM1. In the instant case, the pulse signal PWM1 controls the turn-on device $Q_2$.

The PI controller 311, the limiter 312, and the comparator 313 for driving a control algorithm of the second mode of Control Method 1 of the FIG. 3C may be included in the control circuit 120 of FIG. 1.

Figure 3D:
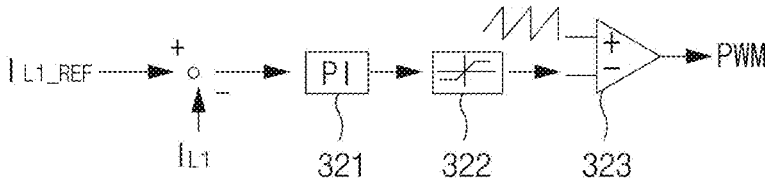

FIG. 3D shows Control method 2 and may be applied for purpose of controlling a magnitude of the current $I_{L1}$ flowing through the inductor $L_1$. In a case where a reference current of the current $I_{L1}$ is represented as $I_{L1\_Ref}$ as in FIG. 3D, the current $I_{L1}$ flowing through inductor $L_1$ is sensed through a current sensor (not shown), and then a difference between the sensed current $I_{L1}$ and the reference current $I_{L1\_Ref}$ is used as an input of a PI controller 321.

An output signal of the PI controller 321 is input to the comparator 323 through the limiter 322, and the comparator 323 compares the sawtooth wave with the output signal of the limiter 322 to output a pulse signal PWM1. The PI controller 321, the limiter 322, and the comparator 323 for driving a control algorithm of the second mode of Control Method 2 of FIG. 3D may be included in the control circuit 120 of FIG. 1.

As such, according to the present disclosure, the signal PWM1 may be generated using a voltage as in FIG. 3C, or the signal PWM1 may be generated using a current as in FIG. 3D, and a signal PWM2 may be generated to operate complementarily with the signal PWM1. Furthermore, according to the present disclosure, the signal PWM2 may be generated using FIG. 3C, or the signal PWM2 may be generated first using FIG. 3D, and then the signal PWM1, which is complementary to the PWM2 signal, may be generated.

In this way, the pulse signal PWM2 may be always operated in complementary operation with the signal PWM1 so that the turn-on devices $Q_2$ and $Q_3$ may not turn on together, and the limiters 312 and 323 may be applied to prevent the PI controllers 311 and 321 from diverging and switches of the boost converter from being fully turned on.

Figure 4A:
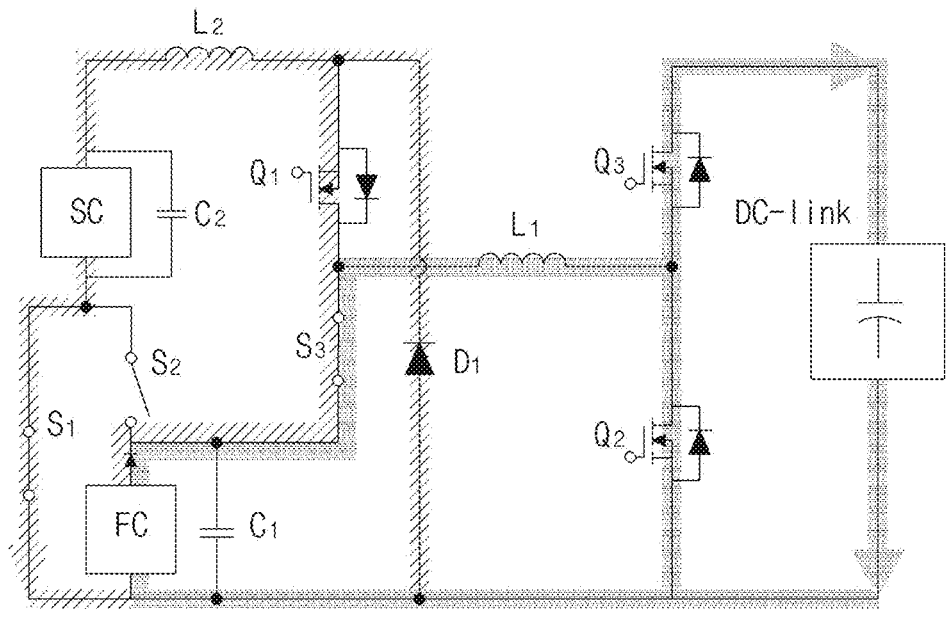
FIGS. 4A, 4B, and 4C illustrate a diagram for describing an example third mode that transfers power to a DC link inverter and charges a supercapacitor through an independent operation of a fuel cell in response to driving a vehicle.
Figure 4B:
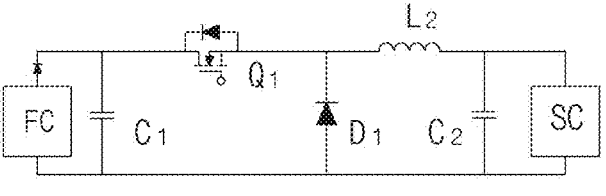
Figure 4C:
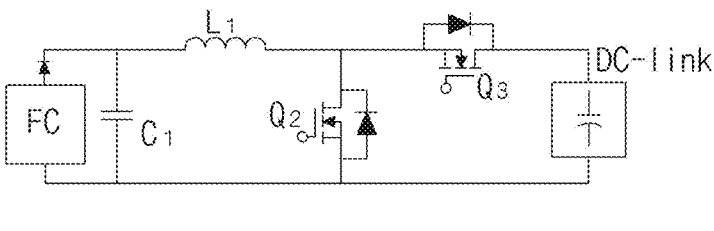

FIGS. 4A, 4B, and 4C illustrate a diagram for describing an example third mode that transfers power to a DC link inverter and charges a supercapacitor through an independent operation of a fuel cell in response to driving a vehicle.

Referring to FIG. 4A, this is a mode for operating a vehicle and charging a supercapacitor together by connecting the switches $S_1$ and $S_3$. In the instant case, according to the present disclosure, in response to driving the vehicle, it has a same boost converter structure as the second mode, and in response to charging the supercapacitor, it operates with a same buck converter structure as that of the first mode. FIG. 4B shows an equivalent circuit in response to charging the supercapacitor in the first mode and is the same as FIG. 2B, and FIG. 4C shows an equivalent circuit in response to driving the vehicle with the fuel cell alone in the second mode and is the same as FIG. 3B. Accordingly, the operation description of the first mode (in response to charging the supercapacitor) and the second mode (in response to driving the vehicle with the fuel cell alone) that will be described above are the same, so a detailed description will be omitted.

In the instant case, like the first mode and the second mode, the power transfer ratio may be determined according to the duty ratio D of the turn-on devices $Q_1$ and $Q_2$, and may be expressed as in Equations 2 and 3 above.

Figure 5A:
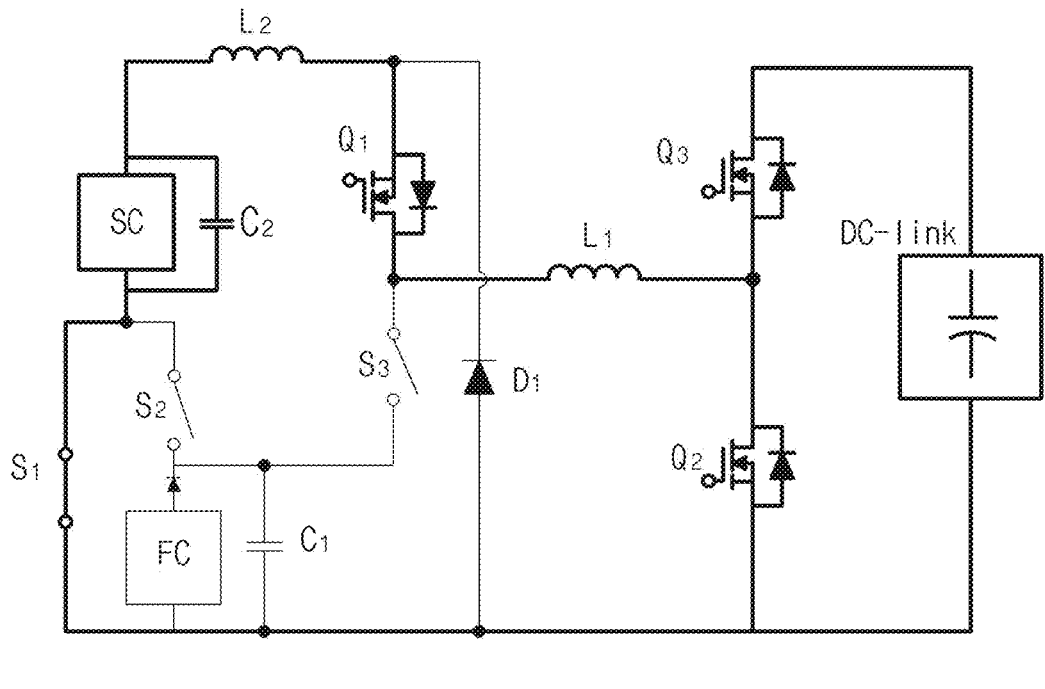
FIGS. 5A, and 5B illustrate a diagram for describing an example fourth mode that transfers power to a DC link inverter through an independent operation of a supercapacitor in response to driving a vehicle.
Figure 5B:
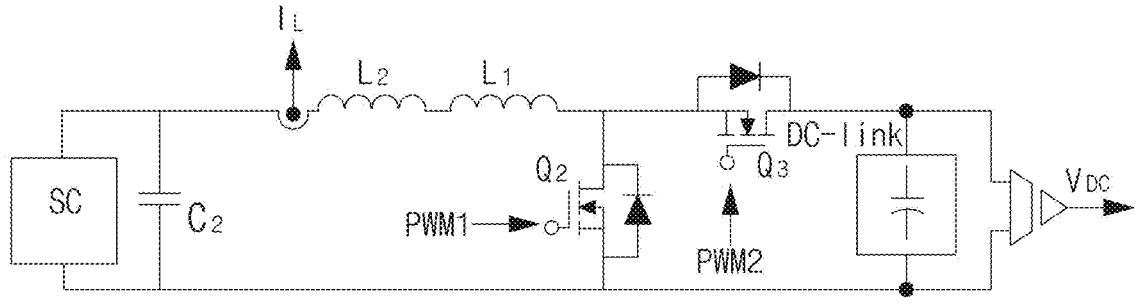

FIGS. 5A and 5B illustrates a diagram for describing an example fourth mode that transfers power to a DC link inverter through an independent operation of a supercapacitor in response to driving a vehicle.

Referring to FIG. 5A, by connecting the switch $S_1$ and fully turning on the turn-on device $Q_1$, a boost converter equivalent circuit may be configured, which is a DC-DC converter of a boost type (the output voltage is applied higher than the input voltage) in which a voltage of the supercapacitor SC becomes an input voltage and a voltage of the DC link side becomes an output voltage, as FIG. 5B.

In a case where the turn-on device $Q_2$ is turned on, the turn-on device $Q_3$ may be turned off, and according to the inductor voltage-current equation (Equation 1), a positive voltage equal to the voltage of the supercapacitor SC may be applied between a left node of the inductor $L_2$ and a right node of the inductor $L_1$, so a current flowing through the inductors $L_1$ and $L_2$ may increase.

In a case where the turn-on device $Q_2$ is turned off, the turn-on device $Q_3$ may be turned on, and according to the inductor voltage-current equation (Equation 1), a negative voltage may be applied between the left node of the inductor $L_2$ and the right node of the inductor $L_1$ as much as the voltage of the supercapacitor SC is subtracted from the voltage of the DC link, so a current flowing through the inductors $L_1$ and $L_2$ may decrease.

In the instant case, a voltage transfer ratio transferred to the output side may be determined according to the duty ratio D of the turn-on device $Q_2$ of the boost converter, and this may be expressed as in Equation 3 described above.

As in the FIG. 3C and FIG. 3D in the second mode, in the fourth mode, the signal PWM may be generated using a voltage $V_{DC}$ of the DC link side or the current IL flowing through the inductors $L_1$ and $L_2$, and the signals PWM1 and PWM2 may be generated to operate complementarily.

Figure 6A:
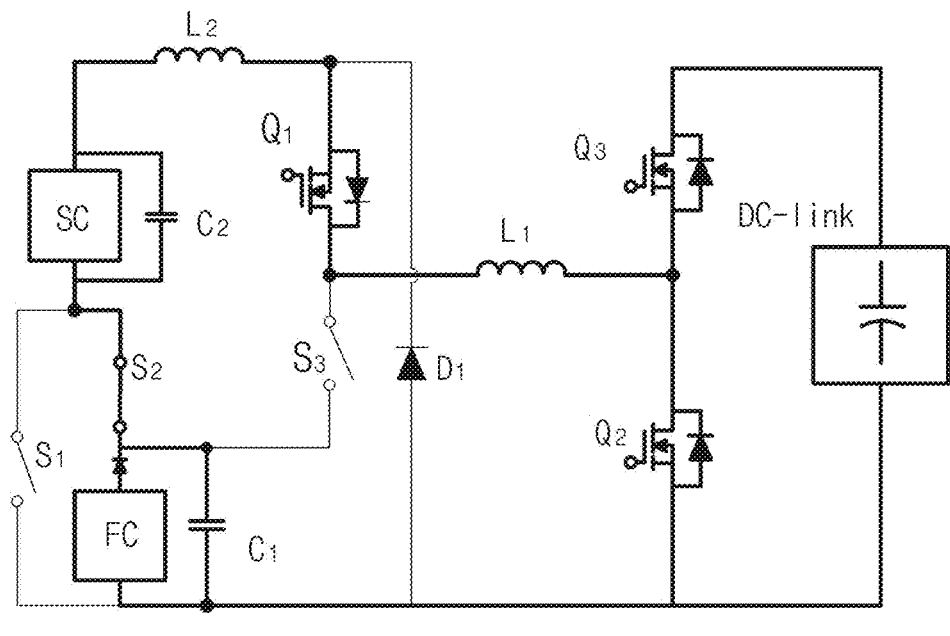
FIG. 6A and FIG. 6B illustrate a diagram for describing an example fifth mode that momentarily outputs high power to a DC link inverter through a fuel cell and a supercapacitor in response to requiring a high-power driving mode.
Figure 6B:
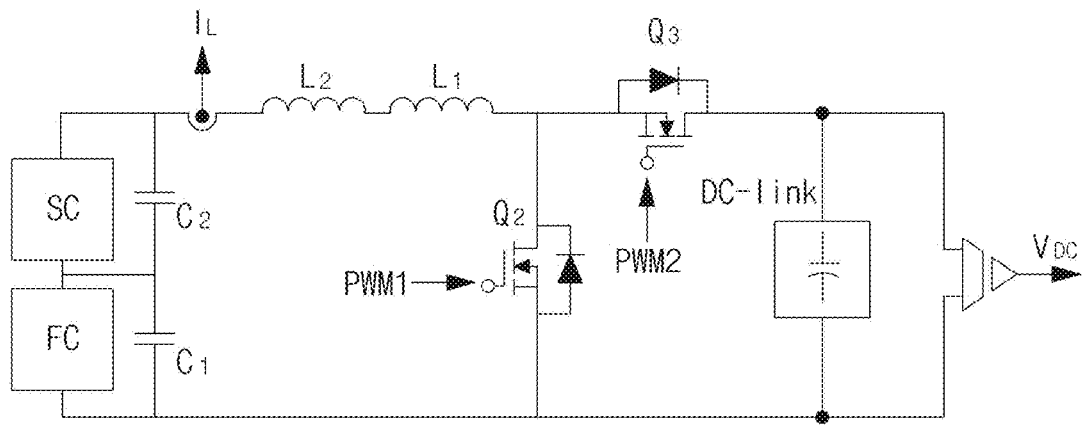

FIG. 6A and FIG. 6B illustrate a diagram for describing an example fifth mode that momentarily outputs high power to a DC link inverter through a fuel cell and a supercapacitor in response to requiring a high-power driving mode.

Referring to FIG. 6A, by connecting the supercapacitor SC and the fuel cell FC in series through connection of the switch $S_2$ and full turn-on of the turn-on device $Q_1$, a boost converter equivalent circuit may be configured, which is a DC-DC converter of a boost type (the output voltage is applied higher than the input voltage) in which a sum of the two power voltages becomes an input and the DC link side becomes an output, as FIG. 6B.

In a case where the turn-on device $Q_2$ is turned on, the turn-on device $Q_3$ may be turned off, and according to the inductor voltage-current equation (Equation 1), a positive voltage equal to a sum of the voltage of the supercapacitor SC and the voltage of the fuel cell FC may be applied a left node of the inductor $L_2$ and a right node of the inductor $L_1$, so a current flowing through the inductors $L_1$ and $L_2$ may increase.

In a case where the turn-on device $Q_2$ is turned off, the turn-on device $Q_3$ may be turned on, and according to the inductor voltage-current equation (Equation 1), a negative voltage may be applied between the left node of the inductor $L_2$ and the right node of the inductor $L_1$ as much as a sum of the voltage of the supercapacitor SC and the voltage of the fuel cell FC is subtracted from the voltage of the DC link side, so a current flowing through the inductors $L_1$ and $L_2$ may decrease.

In the instant case, a voltage transfer ratio transferred to the output side may be determined according to the duty ratio D of the turn-on device $Q_2$ of the boost converter, and this may be expressed as in Equation 3 described above.

As in FIG. 3C and FIG. 3D in the second mode, in the fifth mode, to generate the signal PWM, the signal PWM may be generated using a voltage $V_{DC}$ of the DC link side or the current IL flowing through the inductors $L_1$ and $L_2$, and the signals PWM1 and PWM2 may be generated to operate complementarily.

Figure 7A:
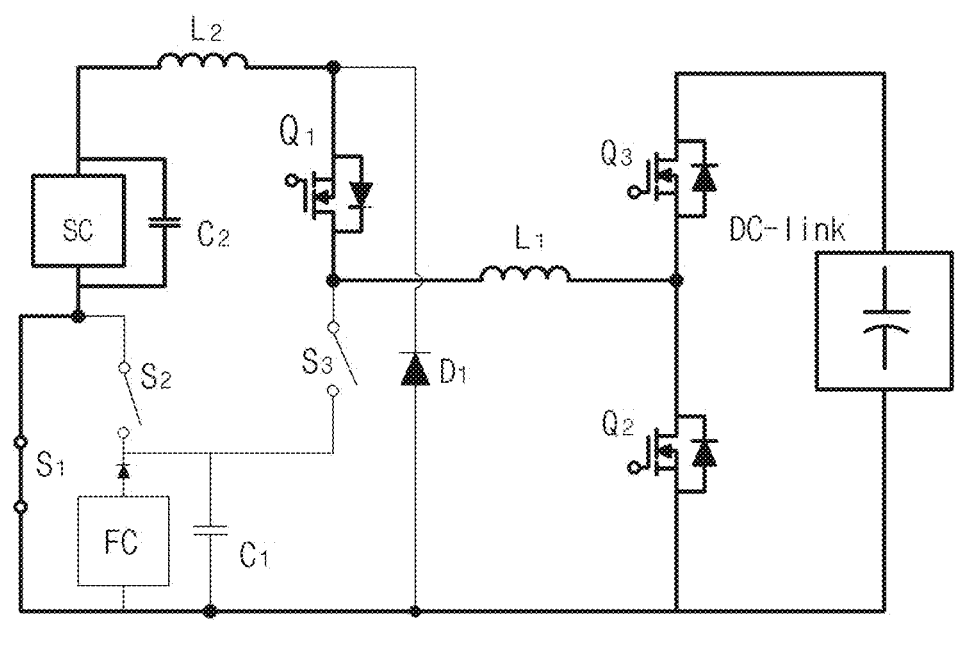
FIG. 7A and FIG. 7B illustrate a diagram for describing an example sixth mode that charges a supercapacitor with power generated by regenerative braking during deceleration of a vehicle.
Figure 7B:
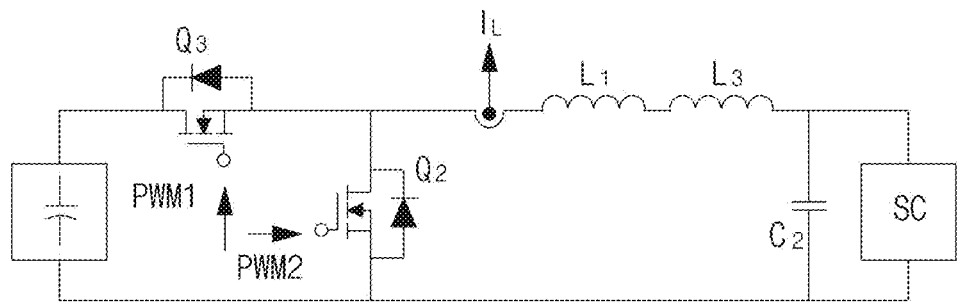

FIG. 7A and FIG. 7B illustrate a diagram for describing an example sixth mode that charges a supercapacitor with power generated by regenerative braking during deceleration of a vehicle.

Referring to FIG. 7A, through connection of the switch $S_1$ and full turn-on of the turn-on device $Q_1$, a buck converter equivalent circuit may be configured, which is a DC-DC converter of a step-down type (the output voltage is applied lower than the input voltage) in which a voltage of the DC link side becomes an input voltage and the supercapacitor SC becomes an output, as in FIG. 7B.

In a case where the turn-on device $Q_3$ is turned on, the turn-on device $Q_2$ may be turned off, and according to the inductor voltage-current equation (Equation 1), a positive voltage may be applied between the left node of the inductor $L_2$ and the right node of the inductor $L_1$ as much as the voltage of the supercapacitor SC is subtracted from the voltage of the DC link, so a current flowing through the inductors $L_1$ and $L_2$ may increase.

In a case where the turn-on device $Q_3$ is turned off, the turn-on device $Q_2$ may be turned on, and according to the inductor voltage-current equation (Equation 1), a negative voltage equal to the voltage of the supercapacitor SC may be applied between the right node of the inductor $L_1$ and the left node of the inductor $L_2$, so a current flowing through the inductors $L_1$ and $L_2$ may decrease.

In the instant case, a voltage transfer ratio transferred to the output side may be determined according to the duty ratio D of the turn-on device $Q_3$ of the buck converter, and this may be expressed as in Equation 2 described above.

In the sixth mode, the signal PWM may be generated using the current IL flowing through inductors $L_1$ and $L_2$, and a control algorithm thereof may be represented as FIG. 2C.

As such, according to the present disclosure, in a series structure of the fuel cell and the supercapacitor, an operation for each mode required during vehicle driving is possible (Precharge operation, fuel cell operation alone, supercapacitor operation alone, fuel cell and super capacitor operations together, regenerative braking operation). In particular, in the fifth mode that momentarily outputs high power to an inverter at the DC link side through the fuel cell and the supercapacitor in response to a case where a high-power driving mode is required, a sum of the voltages of the super capacitor SC and the fuel cell FC of the series structure may become an input voltage of the converter, which reduces a rated voltage of each power source (supercapacitor SC and fuel cell FC), allowing miniaturization of the power net apparatus in the vehicle.

Furthermore, according to the present disclosure, a current magnitude of the converter is reduced to satisfy same output conditions, so current stress and heat generation of the power net apparatus may be reduced.

13

Figure 8:
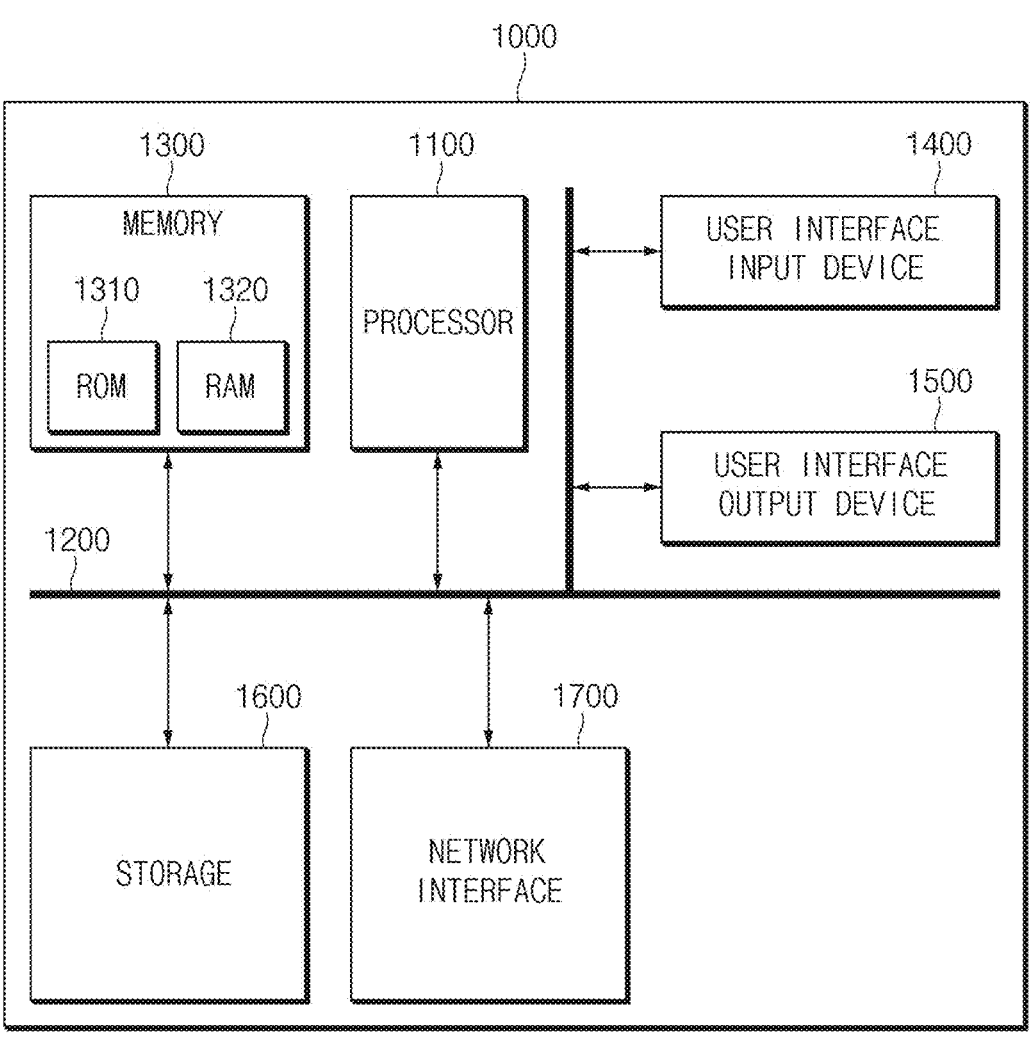
FIG. 8 illustrates an example computing system.

FIG. 8 illustrates an example computing system.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

The invention claimed is:

1. A power net apparatus for a fuel cell, comprising:
a fuel cell configured to supply power to an inverter of a vehicle;
a supercapacitor configured to assist the fuel cell;
a bidirectional converter configured to charge and discharge the fuel cell and the supercapacitor;
a switching device configured to distinguish driving modes for the vehicle; and
a controller configured to drive the vehicle by controlling the supercapacitor to charge or discharge by controlling the switching device and the bidirectional converter according to driving modes for the vehicle, and by assisting the fuel cell;
wherein the driving modes for the vehicle include:
a first mode configured to perform a precharge operation to charge the supercapacitor through the fuel cell in response to starting the vehicle;
a second mode configured to transfer power to the inverter through an independent operation of the fuel cell in response to driving the vehicle; and

a third mode configured to transfer power to the inverter and charges the supercapacitor through the independent operation of the fuel cell in response to the vehicle.

2. The power net apparatus of claim 1, wherein the controller is further configured to control the switching device and the bidirectional converter to supply power to the inverter through an independent operation of the supercapacitor in response to driving the vehicle.

3. The power net apparatus of claim 1, wherein the controller is further configured to control the switching device and the bidirectional converter to charge the supercapacitor using power generated by regenerative braking in response to decelerating the vehicle.

4. The power net apparatus of claim 1, wherein the fuel cell and the supercapacitor are connected in series.

5. The power net apparatus of claim 1, wherein the switching device includes:
a first switch positioned between the fuel cell and the supercapacitor;
a second switch connected in series with the first switch; and
a third switch positioned between a first end of the fuel cell and the bidirectional converter.

6. The power net apparatus of claim 5, wherein the bidirectional converter includes:
a first turn-on device positioned between the supercapacitor and the third switch; and
a second turn-on device and a third turn-on device connected in series;
wherein the second turn-on device and the third turn-on device are configured to transfer a voltage applied from the first turn-on device to the inverter.

7. The power net apparatus of claim 6, wherein the bidirectional converter further includes:
a first inductor positioned between a common node of the second turn-on device and the third turn-on device, and a first end of the first turn-on device; and
a second inductor connected to a first end of the supercapacitor and a second end of the first turn-on device.

8. The power net apparatus of claim 7, wherein the bidirectional converter further includes a diode connected to a second end of the second inductor and a first end of the fuel cell.

9. The power net apparatus of claim 1, wherein the driving modes for the vehicle include:
a fourth mode configured to transfer power to the inverter through an independent operation of the supercapacitor in response to driving the vehicle;
a fifth mode configured to transfer power that is higher than a predetermined reference to the inverter through the fuel cell and the supercapacitor in a case where a high output mode is required in response to driving the vehicle; and
a sixth mode configured to charge the supercapacitor using power generated by regenerative braking in response to decelerating the vehicle.

10. The power net apparatus of claim 9, wherein the controller is configured, in the first mode, to control the bidirectional converter to operate as a buck converter by connecting the first switch and the third switch, opening the second switch, and performing on/off control of the first turn-on device.

11. The power net apparatus of claim 9, wherein the controller is configured, in the second mode, to control the bidirectional converter to operate as a boost converter by connecting the third switch, opening the first switch and the second switch, and performing on/off control of the second turn-on device and the third turn-on device.

12. The power net apparatus of claim 9, wherein the controller is configured, in the third mode, to drive the vehicle through an operation of the fuel cell by connecting the first switch and the third switch, and also charge the supercapacitor through the operation of the fuel cell.

13. The power net apparatus of claim 9, wherein the controller is configured, in the fourth mode, to control the bidirectional converter to operate as a boost converter by connecting the first switch, opening the second switch and the third switch, and performing on/off control of the first turn-on device, the second turn-on device, and the third turn-on device.

14. The power net apparatus of claim 9, wherein the controller is configured, in the fifth mode, to control the bidirectional converter to operate as a boost converter by connecting the second switch, opening the first switch and the third switch, and performing on/off control of the first turn-on device, the second turn-on device, and the third turn-on device.

15. The power net apparatus of claim 9, wherein the controller is configured, in the sixth mode, to control the bidirectional converter to operate as a buck converter by connecting the first switch, opening the second switch and the third switch, and performing on/off control of the first turn-on device, the second turn-on device, and the third turn-on device.

16. The power net apparatus of claim 7, wherein the controller is configured to generate pulse signals for on/off control of the first turn-on device, the second turn-on device, and the third turn-on device by using a current flowing in the first inductor or the second inductor or a voltage at a side of the inverter.

17. The power net apparatus of claim 7, wherein the controller is configured to:

generate a first pulse signal for controlling the first turn-on device using a current flowing in the first inductor or the second inductor or a voltage at a side of the inverter; and generate a second pulse signal complementary to the first pulse signal and to control the second turn-on device using the second pulse signal.

18. A control method for a power net apparatus for a fuel cell, including a fuel cell configured to supply power to an inverter of a vehicle, a supercapacitor configured to assist the fuel cell, a bidirectional converter configured to charge and discharge the fuel cell and the supercapacitor, and a switching device for distinguishing driving modes for the vehicle, the method comprising:

driving, by a controller, the vehicle by controlling the supercapacitor to charge or discharge by controlling the switching device and the bidirectional converter according to driving modes for the vehicle, and by assisting the fuel cell;

wherein the driving modes for the vehicle include:

a first mode configured to perform a precharge operation to charge the supercapacitor through the fuel cell in response to starting the vehicle;

a second mode configured to transfer power to the inverter through an independent operation of the fuel cell in response to driving the vehicle; and a third mode configured to transfer power to the inverter and charges the supercapacitor through the independent operation of the fuel cell in response to the vehicle.

19. The control method of claim 18, wherein driving, by a controller, the vehicle by controlling the supercapacitor to charge or discharge by controlling the switching device and the bidirectional converter according to the driving modes for the vehicle, and by assisting the fuel cell, further includes:

controlling the switching device and the bidirectional converter to supply power to the inverter through an independent operation of the supercapacitor in response to driving the vehicle.

* * * * *